United States Patent Office 3,409,659
Patented Nov. 5, 1968

3,409,659
MONO AND BIS CYANOETHYLATED CYCLOPENTADIENE AND DIELS-ALDER ADDUCTS THEREOF
Roy L. Pruett, Charleston, W. Va., and Stephen Raines, Plymouth Meeting, Pa., assignors to Union Carbide Corporation, a corporation of New York
No Drawing. Filed June 29, 1966, Ser. No. 561,331
5 Claims. (Cl. 260—464)

ABSTRACT OF THE DISCLOSURE

Mono(beta-cyanoethyl)cyclopentadiene, bis(beta-cyanoethyl)cyclopentadiene, and Diels-Alder adducts thereof of the formulas:

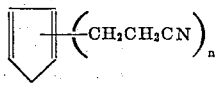

and

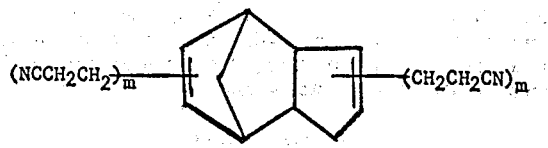

wherein $n$ is one or two, and wherein each $m$ individually is zero, one, or two, provided that at least one $m$ is a number having a value of at least one, are prepared by reacting an excess of cyclopentadiene with acrylonitrile at low temperatures in the presence of a base catalyst. These compositions are useful as intermediates in the preparation of many compounds of known utility. For instance, the compositions can be hydrogenated to form primary amines useful as hardeners for epoxy resins and as curing agents for urethane polymers.

The invention relates to certain base-catalyzed adducts of cyclopentadiene and acrylonitrile, and to certain Diels-Alder derivatives thereof.

H. A. Bruson, in J. Am. Chem. Soc. 64, 2457 (1942), reports the base-catalyzed addition of acrylonitrile to cyclopentadiene to form hexakis(beta-cyanoethyl)cyclopentadiene. However, it is not suggested by Bruson that the mono- or bis-cyanoethyl cyclopentadiene derivatives can be formed. In accordance with the present invention, it has been discovered that mono- and bis(beta-cyanoethyl)cyclopentadiene can be prepared from a carefully controlled reaction of cyclopentadiene and acrylonitrile.

The invention provides the new and useful compounds mono(beta-cyanoethyl)cyclopentadiene, bis(beta-cyanoethyl)cyclopentadiene, and Diels-Alder adducts thereof, mono(beta-cyanoethyl)dicyclopentadiene, bis(beta-cyanoethyl)dicyclopentadiene, tris(beta-cyanoethyl)dicyclopentadiene, and tetrakis(beta-cyanoethyl)dicyclopentadiene. Thus, the compounds of the invention are those that are represented by Formulas I and II:

(I)
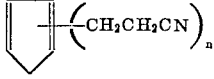

(II)
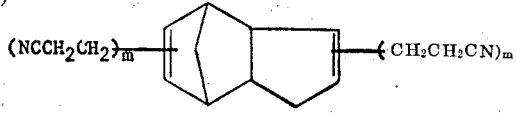

wherein $n$ is one or two, and wherein each $m$ individually is zero, one, or two provided that at least one $m$ is a number having a value of at least one.

The mono- and bis-(beta-cyanoethyl)cyclopentadienes of the invention are prepared by a carefully controlled reaction between acrylonitrile and cyclopentadiene. An excess of cyclopentadiene is employed in order to avoid multi-substitution. For instance, a cyclopentadiene:acrylonitrile molar ratio in the range of from about 2:1 to about 8:1 is useful. Preferably, the molar ratio of cyclopentadiene:acrylonitrile is at least about 4:1. The reaction is carried out at low temperatures, for instance, from about $-20°$ C. to about $+15°$ C., and preferably from about $-5°$ C. to about $+10°$ C. A catalytic quantity of a base is employed. The preferred bases are metallic sodium (which forms sodium cyclopentadienide, in situ) and benzyltrimethylammonium hydroxide. Catalyst quantities of from about 0.5 weight percent to about 20 weight percent, and preferably from about 2 to 10 weight percent (based on weight of acrylonitrile), can be employed. It is desirable to carry out the reaction in an inert solvent such as dioxane and tetrahydrofuran. The amount of solvent is not at all critical, for instance, the solvent can constitute from about 20 to about 70 weight percent of the reaction mixture.

A desirable procedure for preparing the cyclopentadiene compounds of the invention is to slowly add acrylonitrile (e.g., over a period of from one to four hours) to a stirred solution of cyclopentadiene and base catalyst in dioxane or tetrahydrofuran, with the reaction mixture being maintained at a temperature in the range indicated above. After the addition, an additional reaction period of from one to three hours is desirable. The mono- or bis(beta-cyanoethyl)cyclopentadiene product is then recovered by standard methods such as by first removing excess cyclopentadiene by vacuum distillation at a temperature not higher than about $+15°$ C., and then removing the solvent by vacuum distillation at a temperature up to about 25° C., to leave a crude product. The crude product is diluted with a hydrocarbon such as toluene and washed with water to remove the base catalyst. The organic layer is then dried by standard procedures and the solvent is removed by fractional distillation at reduced pressure. The major product formed by the procedure outline above is mono(beta-cyanoethyl)-cyclopentadiene, with minor amounts of bis(beta-cyanoethyl)cyclopentadiene being formed. These products are separable by fractional distillation under vacuum.

The dicyclopentadiene derivatives of the invention are produced by conventional Diels-Alder addition reactions. For instance, when mono(beta-cyanoethyl)cyclopentadiene is heated to a temperature of about 100° C. for from about one to three hours, an essentially complete conversion to bis(beta-cyanoethyl)dicyclopentadiene is effected in accordance with the reaction:

(2)

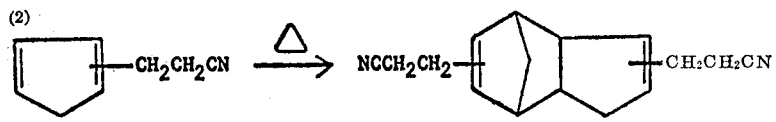

Similarly, the reaction of cyclopentadiene with mono(beta-cyanoethyl)cyclopentadiene yields mono(beta-cyanoethyl)dicyclopentadiene, the reaction of mono(beta-cyanoethyl)cyclopentadiene with bis(beta - cyanoethyl)cyclopentadiene yields tris(beta-cyanoethyl)dicyclopentadiene, and the dimerization of bis(beta-cyanoethyl)cyclopentadiene yields tetrakis(beta-cyanoethyl)dicyclopentadiene.

The compositions of the invention are widely useful. For instance, the novel compositions can be hydrogenated in the presence of Raney nickel to form saturated amines which can be reacted with alkylene oxides to form surfactants. Also, the amines can be employed as hardeners for epoxy resins and as curing agents for urethane polymers. The said amines can also be reacted with propylene oxide to form polyols useful in the preparation of urethane polymers. The diamines can be reacted with dibasic acids to form polyamides. Also, the said saturated amines can be phosgenated by known techniques to produce highly useful isocyanates of known utility.

The following examples illustrate the practice of the invention:

EXAMPLE 1

Monocyanoethylation of cyclopentadiene, 2:1 molar ratio of cyclopentadiene to acrylonitrile, Triton B catalyst A 500-ml., 4-neck flask was fitted with a mechanical stirrer, thermometer, nitrogen by-pass and graduated dropping funnel. In the flask, under a nitrogen atmosphere, were mixed 200 ml. of dioxane, 132 g. (2.0 mole) of freshly distilled cyclopentadiene and 6.0 ml. of 30% benzyltrimethylammonium hydroxide in methanol (i.e., "Triton B"). The solution was cooled to 0° C. with an ice-salt bath and 56 g. (1.0 mole) of acrylonitrile was added over a two-hour period. The temperature of the reaction was maintained at 3–5° C. After the completion of the addition the mixture, which was wine-red in color, was stirred for an additional three hours.

While still cold, the reaction mixture was transferred to a 1-liter round-bottom flask and the pressure reduced until the excess reactants and some solvent had distilled. The temperature was raised to 25° C. and the remainder of the solvent was distilled at reduced pressure.

The residue was dissolved in toluene and the resulting solution was washed with water. This caused the dissolution of a small amount of tarry material. The washed organic layer was dried over anhydrous sodium sulfate and the solvent was removed by flash distillation at reduced pressure. There remained 40 g. of residue. Distillation in a Hickman alembic molecular still gave 14 g. of liquid distilling at 50° C. and 0.02–0.05 mm., 15 g. of viscous liquid distilling at 130° C. and 0.02 mm. and 11 g. of very viscous, non-distillable residue. The more volatile fraction is that compound later identified as β-cyclopentadienyl propionitrile, i.e., mono(beta-cyanoethyl)cyclopentadiene.

EXAMPLE 2

Monocyanoethylation of cyclopentadiene, 4:1 molar ratio of cyclopentadiene to acrylonitrile, Triton B catalyst A 1-liter, 4-neck flask was fitted with a stirrer, thermometer, nitrogen by-pass and a graduated dropping funnel. The flask was charged with 200 ml. dioxane, 264 g. (4.0 mole) of freshly-distilled cyclopentadiene and 8.0 ml. of 30% benzyltrimethylammonium hydroxide in methanol. To the cold (−5 to 0° C.) stirred solution was added, under a nitrogen atmosphere and over a period of three hours, 56 g. (1.0 mole) of acrylonitrile. Stirring was continued for three additional hours after completion of the addition.

While still cold, the mixture was stripped of excess cyclopentadiene and solvent as in Example 1. The residue was dissolved in toluene, washed with water, dried and the toluene removed by vacuum distillation. The residue was distilled in the molecular still, 20 g. distilled at 40–60° C. and 0.01–0.02 mm., 4 g. distilled at 60–120° C., and 16 g. of very viscous red liquid distilled at 120–130° C.

The IR spectrum of the more volatile fraction showed conjugated carbon-to-carbon double bond and a strong —C≡N absorption.

Analysis.—Calculated for $C_8H_9N$: C, 80.63; H, 7.61; N, 11.76. Found: C, 80.56; H, 7.68; N, 10.81.

EXAMPLE 3

Monocyanoethylation of cyclopentadiene, 4:1 molar ratio of cyclopentadiene to acrylonitrile, Triton B catalyst Another condensation was conducted under conditions similar to those described in Example 2. Immediately following the distillation in the molecular still, the more volatile fraction (40° C. at 0.01 mm.) was analyzed by n.m.r. and molecular weight determination. The n.m.r. spectrum was fully consistent with the formulation mono(beta-cyanoethyl)cyclopentadiene. The found molecular weight was 122±3 (calculated for $C_8H_9N$; 119).

EXAMPLE 4

Dimerization to bis(beta-cyanoethyl)dicyclopentadiene

A sample of the monocyanoethylated product, which had been distilled at 40° C. and 0.01 mm. in the molecular still, was heated for two hours in a steam bath. During the time the sample became noticeably more viscous. After cooling to room temperature, the IR spectrum of the product was different from the unheated material. The bond for —C≡N was still present, but the conjugated carbon-to-carbon double bond absorption had disappeared. A molecular weight determination now gave a value of 220±7 (Calculated for $C_{16}H_{18}N_2$: 238).

EXAMPLE 5

Separation of bis(beta-cyanoethyl)dicyclopentadiene and tris(cyanoethyl)dicyclopentadiene A 6 g. portion of the higher-boiling fraction obtained in Example 2 (120–130° C. and 0.01–0.02 mm.) was placed on a silica gel column. Elution was then accomplished by successive washings with cyclohexane, benzene, chloroform, ether and acetone. The ether solution, upon evaporation, yielded 3.4 g. of a slightly yellow liquid.

Analysis.—Calculated for $C_{16}H_{18}N_2$: M.W., 238. Found: 242±7.

The acetone solution, upon evaporation, gave 2.0 g. of tris(beta-cyanoethyl)dicyclopentadiene.

Analysis.—Calculated for $C_{19}H_{21}N_3$: M.W., 291. Found: M.W. 303±7.

EXAMPLE 6

Monocyanoethylation of cyclopentadiene, 6:1 molar ratio of cyclopentadiene to acrylonitrile, Triton B catalyst The procedure of Example 1 was repeated, except for the quantities of cyclopentadiene and acrylonitrile which were in a 6:1 molar ratio, respectively. The IR spectrum of the residue oil, before distillation in the molecular still, was characteristic of mono-cyanoethylated cyclopentadiene.

EXAMPLE 7

Monocyanoethylation of cyclopentadiene, sodium catalyst

A 3-neck, 500-ml. flask was fitted with a stirrer, nitrogen atmosphere, thermometer and dropping funnel. In the flask were placed 165 ml. of freshly-distilled cyclopentadiene, 2 ml. of 30% sodium dispersed in kerosene and 20 ml. of tetrahydrofuran. After cooling to −10° C. with an ice-salt bath, 33 ml. of acrylonitrile was added slowly. After the addition was complete, the mixture was stirred for 3.5 hours at −8 to −10° C.

The excess sodium cyclopentadienide was destroyed by addition of 10 ml. of water and 2 g. of ammonium chloride. The solvent and excess cyclopentadiene were removed by distillation at reduced pressure and below room temperature.

The residue was dissolved in benzene and the resulting solution was washed with water, then dried over anhydrous sodium sulfate. Removal of solvent by vacuum distillation produced 18 g. of a slightly yellow oil. The IR spectrum showed the product to be the same as that produced in Example 1.

EXAMPLE 8.—ILLUSTRATION OF UTILITY

Bis(3-aminopropyl)tricyclo[5.2.1.0$^{2,6}$]decane

A 500-ml. pressure vessel was charged with 30 g. of bis(β-cyanoethyl)dicyclopentadiene, 150 ml. of absolute ethanol, 5 g. of Raney nickel and 25 g. of anhydrous ammonia. The vessel was sealed and pressurized with 1500 p.s.i. hydrogen. The hydrogenation was conducted in two steps, 75° C. and 1000–2000 p.s.i. for 3 hours then 20 hours at 120° C. and 2500–4000 p.s.i.

After cooling to room temperature the autoclave was vented, opened and the contents filtered to remove the Raney nickel. The residue obtained after removal of solvent was distilled in a mlecular still. The diamine, 18 g., distilled at 120–130° C. and 0.01–0.02 mm. The IR spectrum of this product showed the absence of —C≡N absorption and strong absorption for —NH$_2$. The n.m.r. spectrum showed the presence of primary amino-hydrogens and absence of vinylic unsaturation.

*Analysis.*—Calculated for C$_{16}$H$_{30}$N$_2$: M.W., 250; equivalent wt. 125. Found: M.W., 229; equivalent wt. 128.

What is claimed is:

1. A composition consisting of a mixture of isomers of the formula

wherein *n* represents 1 or 2, or (b)

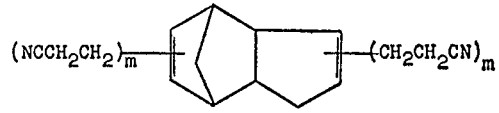

wherein each *m* represents 0, 1, or 2 provided that at least one *m* represents a whole positive integer.

2. The composition of claim 1 wherein said composition is mono(beta-cyanoethyl)cyclopentadiene.

3. The composition of claim 1 wherein said composition is bis(beta-cyanoethyl)cyclopentadiene.

4. The composition of claim 1 wherein said composition is bis(beta-cyanoethyl)dicyclopentadiene.

5. The composition of claim 1 wherein said composition is tris(beta-cyanoethyl)dicyclopentadiene.

References Cited

UNITED STATES PATENTS 2,280,058    5/1941    Bruson _____ 260—465

Russian Chemical Reviews, volume 30, No. 11, p. 593 (November 1961).

CHARLES B. PARKER, *Primary Examiner.*

S. T. LAWRENCE III, *Assistant Examiner.*